(No Model.)
F. M. ARCHER.
ELECTRIC BATTERY.
No. 495,177. Patented Apr. 11, 1893.
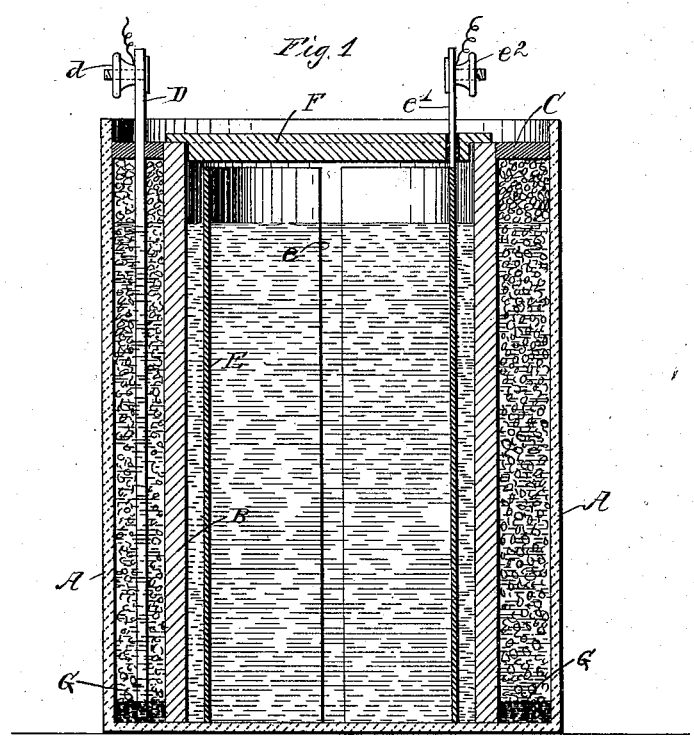
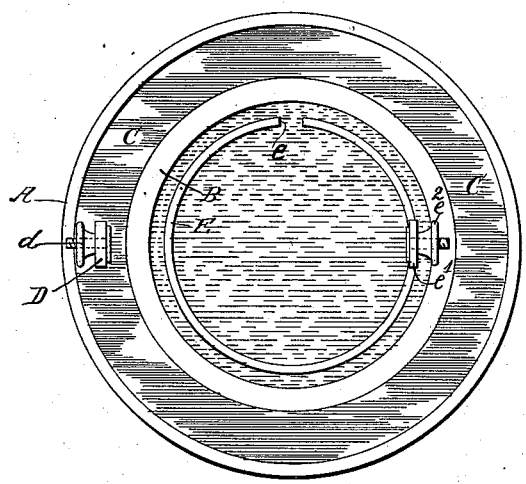
Witnesses
C. R. Ferguson
Wm A Pollock
Inventor
Frank M. Archer
By his Attorney
Edwin H. Brown

UNITED STATES PATENT OFFICE.

FRANK M. ARCHER, OF NEW YORK, N. Y., ASSIGNOR, BY MESNE ASSIGNMENTS, TO THE HERO ELECTRIC COMPANY, OF JERSEY CITY, NEW JERSEY.

ELECTRIC BATTERY.

SPECIFICATION forming part of Letters Patent No. 495,177, dated April 11, 1893.

Application filed November 25, 1891. Serial No. 413,139. (No model.)

*To all whom it may concern:*

Be it known that I, FRANK M. ARCHER, of New York, in the county and State of New York, have invented a certain new and useful Improvement in Electric Batteries, of which the following is a specification.

I will describe an electric battery embodying my improvement and then point out the novel features in a claim.

In the accompanying drawings, Figure 1 is a central vertical section of an electric battery embodying my improvement. Fig. 2 is a top view of the same.

Similar letters of reference designate corresponding parts in both figures.

A designates a cell of glass or other suitable material, here shown as of cylindric form.

B designates a shell of porous material arranged within the cell A. The material ordinarily employed for the porous cups of batteries will serve for this porous shell. As here shown this shell is cylindric in form to conform to the cell A. It is considerably smaller in diameter than the cell. It is represented as made without any bottom, but this is not an essential feature. Its lower edge rests upon the bottom of the cell A. Preferably I make a tight joint between the lower edge of the shell and the bottom of the cell A and this may be done by applying melted paraffine or other wax to the points of contact. Ordinarily the inner side of the bottom of the cell A will be slightly concave, and when such is the case melted wax may be readily applied to it around the shell B.

The space between the shell B and the wall of the cell A is substantially filled with pieces of carbon and manganese. While the proportions of the carbon and manganese may vary considerably, I shall preferably use about seven parts of carbon to one part of manganese. The upper part of this space is covered in any suitable manner, as for instance, by paper C saturated or impregnated with paraffine or otherwise. The wax will advantageously be applied after the paper is inserted in its place, so as to form a tight joint between the cell and shell. Into the space containing the pieces of carbon and manganese a rod or pencil, D, extends. Preferably this will be of carbon. It is shown as extending through the cover C and nearly to the bottom of the cell A. Its upper end is provided with a binding screw $d$, to which a circuit wire may be attached.

Within the porous cup B is a zinc element E. This is shown as made in the form of a cylinder somewhat smaller than the interior of the shell B, so that a space will be left between it and said shell. This zinc cylinder will be provided with an opening or openings permitting of the passage of liquid through the cylinder. As here shown, it is provided with a single opening made in the form of a vertical slot $e$.

It will be seen that the zinc cylinder E does not extend quite as high as the top of the porous shell B, and that a cover, F, extends over said cylinder and shell. This cover may be made of any suitable material, as, for instance, wood impregnated with paraffine or other wax. As shown, this cover F has a central hub-like portion extending down into the porous shell and a flange lapping over the top of said shell. It is intended to form a close joint with the shell.

The zinc cylinder E has a tang or rod $e'$ extending up from it through the cover F. This tang or rod is provided outside the cover with a binding screw $e^2$ for the attachment of a circuit wire. Any suitable exciting solution may be used in this battery, as, for instance, a solution of sal ammonia $e$, or a solution consisting of ten parts of water to one part of sulphuric acid.

The solution will be introduced into the porous shell B and will pass thence into the space between the latter and the cell A.

I have shown in the lower part of the space between the shell B and wall of the cell A, a pad G of absorbent material, such as wool. This pad will be saturated with some agent which can be absorbed by the porous shell for the purpose of reducing the internal resistance of the battery without perforating the porous shell, as, for instance, it may be saturated with strong sulphuric acid.

By my improvement I produce a battery very cheap in construction, economical in use and giving a high voltage, as well as a high ampere current. As it is hermetically sealed, it will not be liable to creeping salts. It is capable of being easily transported, even after the introduction of the exciting solution. Furthermore, by my improvement, I am enabled to use the carbon outside the porous shell and the zinc element inside, while obtaining a very great extent of carbon surface. The zinc element being removable, that side of the porous shell which requires cleaning is exposed, so that it may be cleaned by hot water introduced within the shell.

What I claim as my invention, and desire to secure by Letters Patent, is—

In a battery, the combination of a cell, a porous shell or diaphragm arranged vertically within said cell, a zinc element within said shell or diaphragm, pieces of carbon in the space between said shell or diaphragm and the wall of the cell, and absorbent material saturated with acid and arranged in the lower part of the space between the cell and the porous shell or diaphragm, substantially as specified.

In testimony whereof I have signed my name to this specification in the presence of two subscribing witnesses.

FRANK M. ARCHER.

Witnesses:
 WM. A. POLLOCK,
 C. R. FERGUSON.